(12) United States Patent
Fredriksson et al.

(10) Patent No.: US 8,842,039 B2
(45) Date of Patent: Sep. 23, 2014

(54) GUIDED WAVE RADAR LEVEL GAUGE WITH IMPROVED SEALING ARRANGEMENT

(75) Inventors: Hakan Fredriksson, Linkoping (SE); Mikael Eriksson, Vastervik (SE)

(73) Assignee: Rosemount Tank Radar AB, Gothenburg (SE)

( * ) Notice: Subject to any disclaimer, the term of this patent is extended or adjusted under 35 U.S.C. 154(b) by 332 days.

(21) Appl. No.: 13/478,702

(22) Filed: May 23, 2012

(65) Prior Publication Data

US 2013/0314275 A1 Nov. 28, 2013

(51) Int. Cl.
*G01F 23/284* (2006.01)
*G01S 13/08* (2006.01)

(52) U.S. Cl.
CPC .............. *G01F 23/284* (2013.01); *G01S 13/08* (2013.01)
USPC .......................... 342/124; 324/644; 73/290 R

(58) Field of Classification Search
CPC ................................ G01F 23/284; G01S 13/08
USPC ........................... 342/124; 324/644; 73/290 R
See application file for complete search history.

(56) References Cited

U.S. PATENT DOCUMENTS

| 7,255,002 B2 | 8/2007 | Gravel et al. | |
|---|---|---|---|
| 2007/0084281 A1 | 4/2007 | Fredriksson | |
| 2009/0178478 A1* | 7/2009 | Reimelt et al. | 73/290 V |
| 2009/0229359 A1 | 9/2009 | Reimelt et al. | |
| 2010/0141505 A1* | 6/2010 | Bergmann et al. | 342/124 |
| 2012/0169527 A1* | 7/2012 | Edvardsson | 342/124 |
| 2013/0113500 A1* | 5/2013 | Chen et al. | 324/637 |
| 2013/0269430 A1* | 10/2013 | Mauduit et al. | 73/290 V |
| 2013/0314275 A1* | 11/2013 | Fredriksson et al. | 342/124 |
| 2014/0159944 A1* | 6/2014 | Fredriksson | 342/124 |

FOREIGN PATENT DOCUMENTS

| EP | 0762089 A2 * | 3/1997 |
|---|---|---|
| EP | 2667163 A1 * | 11/2013 |
| EP | 2715400 A1 * | 4/2014 |
| WO | WO 2007053007 A1 * | 5/2007 |

OTHER PUBLICATIONS

European Search Report/Communication dated Aug. 9, 2013 for Appln. No. 13168199.1-1553.

* cited by examiner

*Primary Examiner* — John B Sotomayor
(74) *Attorney, Agent, or Firm* — Westman, Champlin & Kelly, P.A.

(57) ABSTRACT

A radar level gauge for determining a filling level of a product contained in a tank. The gauge has a sealing arrangement comprising a hollow housing, a conductor and a dielectric sleeve arranged inside the housing and surrounding the conductor. At least one gap is formed between the dielectric sleeve and an adjacent, electrically conducting surface, the gap having a first end which is open to an interior of the tank, so that in use, tank atmosphere may enter and condensate in the gap. The sealing arrangement further comprises an electrically conducting coating provided on a surface of the dielectric sleeve facing the gap, and in electrical contact with said adjacent, electrically conducting surface, so that an impedance between the electrically conducting coating and the adjacent electrically conducting surface is sufficiently low at an operating frequency of the gauge to reduce an influence of any medium present in the gap.

19 Claims, 3 Drawing Sheets

GUIDED WAVE RADAR LEVEL GAUGE WITH IMPROVED SEALING ARRANGEMENT

TECHNICAL FIELD OF THE INVENTION

The present invention relates generally to a guided wave radar level gauge for determining a filling level of a product contained in a tank, and in particular such a gauge including a probe extending into the tank, and adapted for high temperature, high pressure conditions.

TECHNICAL BACKGROUND

Microwave level gauge, or radar level gauge (RLG), systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a guided wave transmission line.

Such a probe is generally arranged to extend vertically from the top towards the bottom of the tank. The probe may also be arranged in a measurement tube, a so-called chamber, which is connected to the outer wall of the tank and is in fluid connection with the inside of the tank. Typically, the probe extends from a transmitter/receiver assembly into the product inside the tank, or chamber, via a sealing arrangement which may form a hermetic barrier.

The most common type of guided wave radar uses short pulses (around 1 ns) without carrier and occupy a frequency range of roughly 0.1-1 GHz.

Document U.S. Pat. No. 7,255,002 describes such a guided wave radar level gauge for measuring a level of process material in a tank having an improved sealing arrangement comprising a ceramic seal body which is sealingly joined via brazing on its outer surface to a housing such that the conductor is sealed from the tank atmosphere.

Under some conditions moisture and condensation may enter any gaps formed between the ceramic seal body and the surrounding surfaces. Such moisture or condensation may disturb the reception of the reflected signals such that quality and durability of determination and measurement of the product level is reduced. Such problems may be present for example if the gauge is exposed to high pressure, thus forcing tank atmosphere into the gaps. However, a temperature gradient throughout the sealing arrangement may be sufficient to cause problems with condensation in the gaps, also in a situation without high pressure,

GENERAL DISCLOSURE OF THE INVENTION

An object of the present invention is to at least alleviate the problems discussed above. In particular, an object is to provide an improved guided wave radar level gauge for determining a filling level of a product contained in a tank.

These and other objects are achieved by a guided wave radar level gauge and a method according to the independent claims. Preferred embodiments of the invention are presented in the dependent claims.

According to a first aspect the invention relates to a guided wave radar level gauge for determining a filling level of a product contained in a tank, which level gauge comprises a transceiver for generating electromagnetic transmit signals and receiving electromagnetic echo signals reflected at a surface of the product, a probe connected to the transceiver and configured to extend into the tank and to guide the transmit signals towards the surface and to guide the echo signals to the transceiver, and a sealing arrangement allowing transmission of electromagnetic signals through a tank seal, the sealing arrangement comprising a hollow housing, a conductor extending inside the housing for transmitting electromagnetic signals between the transceiver and the probe, and a dielectric sleeve arranged inside the housing and surrounding the conductor. At least one gap is formed between the dielectric sleeve and an adjacent, electrically conducting surface, the gap having a first end which is open to an interior of the tank, and a second end, which is closed by the tank seal, so that in use, tank atmosphere may enter and condensate in the gap. The sealing arrangement further comprises an electrically conducting coating provided on a surface of the dielectric sleeve facing the gap, and in electrical contact with the adjacent, electrically conducting surface so that an impedance between said electrically conducting coating and said adjacent electrically conducting surface is sufficiently low at an operating frequency of said gauge to reduce an influence of any medium present in said gap.

According to a second aspect the invention relates to a method for determining a filling level of a product contained in a tank comprising the steps of generating electromagnetic transmit signals, guiding the transmit signals towards the surface by means of a probe extending into the tank, guiding echo signals reflected at a surface of the product by means of the probe, receiving the echo signals, and determining the filling level based on a relationship between the transmit signals and the echo signals. The method further comprises the steps of transmitting the transmit signals and the echo signals along a conductor extending through a dielectric sleeve inside a housing, and bringing an electrically conducting coating provided on a surface of the dielectric sleeve into electrically conducting contact with an adjacent, electrically conducting surface, thereby ensuring that an impedance between the electrically conducting coating and the adjacent electrically conducting surface is sufficiently low at an operating frequency of the gauge to reduce any influence of a medium present in a gap formed between the dielectric sleeve and the adjacent, electrically conducting surface, the gap having an open end facing the tank, allowing tank atmosphere to enter and condensate in the gap.

When used in the claims, the term "probe" is intended to refer to any type of guided wave transmission medium that allows an electromagnetic signal to propagate along the probe towards the surface of the product in the tank. Several examples will be given in the detailed description.

When used in the claims, the term "adjacent" is intended indicate a close distance but not sufficiently close to prevent vapor or condensate to enter a gap formed between the two adjacent surfaces. For example, the dielectric sleeve is typically adapted to fit snuggly onto the conductor. Nevertheless, due to practical limitations of manufacturing tolerances there may be a small gap into which tank atmosphere may enter. A gap may also form during temperature variations, due to differences in heat expansion coefficients between the sleeve on the one hand, and the housing and/or conductor on the other hand.

The invention is based on the realization by the inventors that the performance of the sealing arrangement may be improved by providing an electrically conductive surface coating on the inner surface of the dielectric sleeve facing the conductor, and/or on the outer surface of the sleeve facing the housing. Thereby, interference from e.g. condensation or moisture formed in or penetrating into the gap between the dielectric sleeve and the conductor and/or between the dielectric sleeve and the housing may be reduced. Such condensation or moisture may otherwise influence the effective thickness of the dielectric sleeve, thereby interfering with the signal transmission.

According to the present invention, the formation of a gap between the dielectric sleeve and the conductor and/or between the dielectric sleeve and housing is no longer as critical, and the tolerance requirements on the manufacturing process are thus relaxed. Also manufacturing tolerances and alignment requirements during assembling of the RLG according to the present invention may be alleviated.

The coating of the dielectric sleeve also allows for improved capabilities to withstand chemical erosion in acidic, or caustic, environments.

According to one embodiment, the electrically conducting coating and the adjacent electrically conducting surface are brought into galvanic contact, to ensure that both sides of the gap are held at an equal electrical potential (i.e. they will be short circuited). By short-circuiting the gap, any medium entering the gap between will not have any influence on the signal transmission properties.

The gap may include a first gap formed between the sleeve and the conductor, and the electrically conductive surface coating may then include a first electrically conductive surface coating provided on an inner surface of the sleeve.

The gap may also include a second gap formed between the sleeve and the housing, and the electrically conductive surface coating may then include a second electrically conductive surface coating provided on an outer surface of the sleeve.

The conductor member may be suspended in relation to the housing by the dielectric sleeve. For example, the conductor member may include a radially extending girdle, which abuts against a support surface of the dielectric body so that the conductor member is suspended by the dielectric sleeve. Thereby the conductor member is suspended and isolated from the housing in a durable manner wherein the girdle rests on the support surface, directly or indirectly, while microwave signals advantageously may be coupled through the dielectric body with reduced interference.

Generally, other objectives, features, and advantages of the present invention will appear from the following detailed disclosure, from the attached dependent claims as well as from the drawings.

BRIEF DESCRIPTION OF DRAWINGS

The present invention will be described in more detail with reference to the appended drawings, showing currently preferred embodiments of the invention. It should be understood that the drawings are not true to scale and, as is readily appreciated by a person skilled in the art, dimensions other than those illustrated in the drawings are equally possible within the scope of the invention.

DETAILED DESCRIPTION OF EMBODIMENTS OF THE INVENTION

Figure 1:
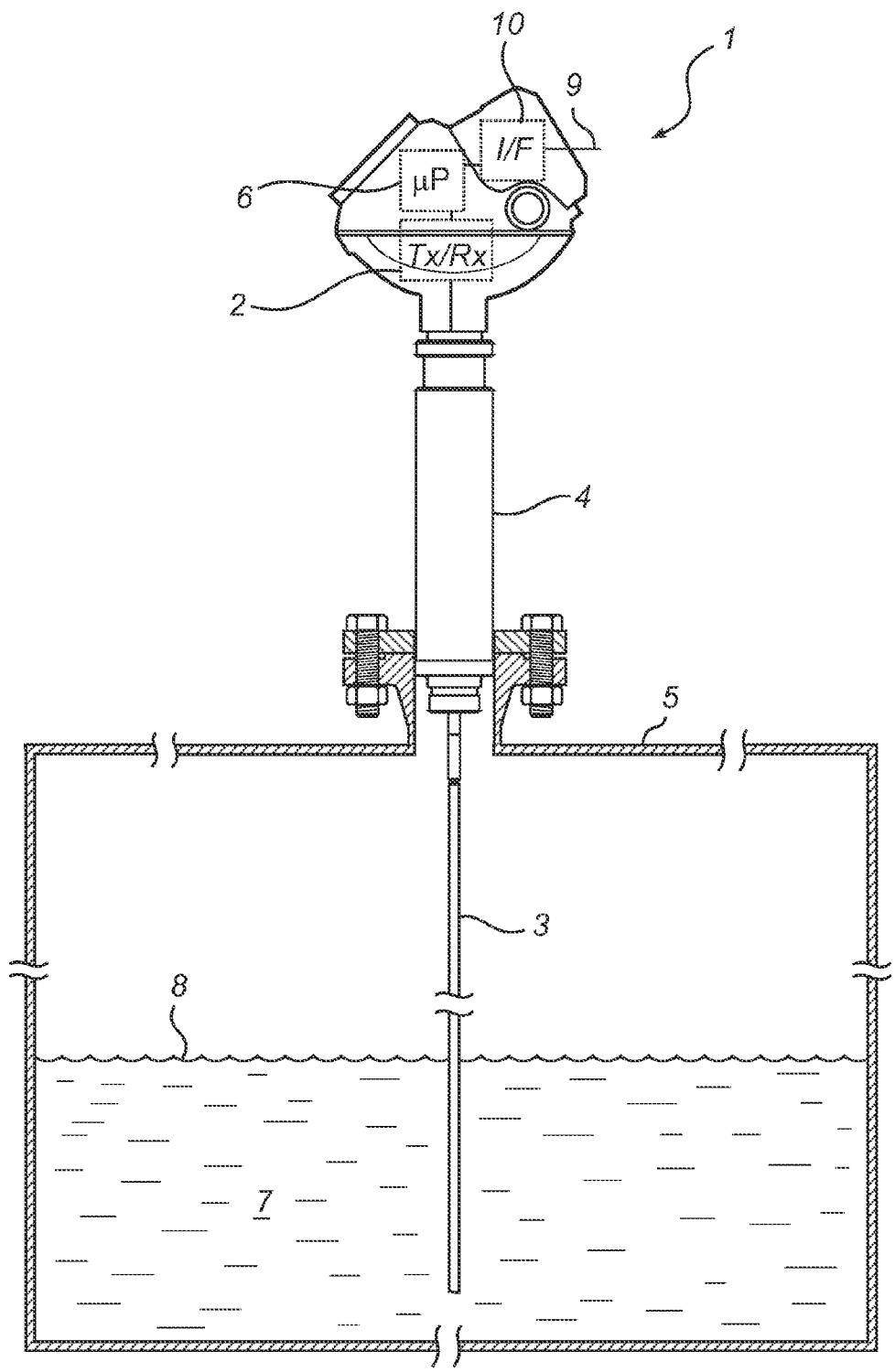
FIG. 1 is a schematic view of a radar level gauge system mounted on a tank.

In the drawings, similar, or equal elements are referred to by equal reference numerals.

FIG. 1 schematically illustrates a radar level gauge system 1 according to an embodiment of the present invention, mounted on a tank 5. The gauge system 1 includes transceiver circuitry 2 for transmitting and receiving electromagnetic signals, which transceiver circuitry 2 is connected to a guided wave probe 3.

Examples of probes are transmission lines with two or more conductors, such as a twin line or a coaxial line. For practical level gauging applications using signals below 1 GHz (with wavelength above 300 mm) a transmission line diameter of 3-20 mm is commonly used. Other examples of probes include surface wave guides (SWGs), such as a single line transmission line (Goubau probe) or tube with or without dielectric coating. A surface wave guide can be very thin as compared to the wavelength; 4-8 mm is a common SWG diameter for use below 1 GHz. The probes may be essentially rigid or flexible and they may be made from metal, such as stainless steel, plastic, such as PTFE, or a combination thereof.

The gauge system 1 further comprises processing circuitry 6 which is connected to the transceiver 2 for control of the transceiver and processing of signals received by the transceiver to determine the filling level of a product 7 in the tank 5.

The transmitted electromagnetic signals, typically microwaves, are reflected at the surface of the product, and the reflected signals are received by the transmitter/receiver assembly comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the time-of-flight) and the propagation velocity of the electromagnetic signals.

In order to prevent contents from the tank escape into the gauge and further to the outside atmosphere, the transceiver 2 is connected to the probe 3 via a sealing arrangement 4. The sealing arrangement 4 includes a tank seal, which may be a high temperature and/or high pressure seal (HTHP-seal), and will be described in more detail below. On the tank side of the tank seal the sealing arrangement is open to the tank, meaning that tank atmosphere and condensation may enter the sealing arrangement.

The processing circuitry 6 is, furthermore, connectable to external communication lines 9 for analog and/or digital communication via an interface 10. Although not shown in FIG. 1, the radar level gauge system 1 is typically connectable to an external power source, or may be powered through the external communication lines 9. Alternatively, the gauge may communicate wirelessly using e.g. a Wireless HART protocol, and use a local power supply (not shown) with batteries or other means of scavenging energy for autonomous operation.

In operation, the processing circuitry 6 controls the transceiver circuitry 2 to transmit electromagnetic signals to be guided by the probe 3 towards the surface 8 of the product 7. By analyzing transmitted signals $S_T$ and reflected signals $S_R$ traveling back from the surface 8, the processing circuitry 6 can determine the distance between a reference position (such as the tank ceiling) and the surface 8 of the product 7, whereby the filling level or other process variable can be deduced. It should be noted that, although a tank 5 containing a single product 7 is discussed herein, the distance to any material interface along the probe can be measured in a similar manner.

In a typical GWR application, the transmit signals are short pulses (around 1 ns) without carrier and occupy a frequency range of roughly 0.1-1 GHz. The distance can be determined based on time domain reflectometry (TDR).

Such pulsed radar level gauge systems typically have a first oscillator for generating a transmission signal formed by pulses for transmission towards the surface of the product contained in the tank with a transmitted pulse repetition frequency $f_t$, and a second oscillator for generating a reference signal formed by reference pulses with a reference pulse repetition frequency $f_r$ that differs from the transmitted pulse repetition frequency by a given frequency difference $\Delta f$. This frequency difference $\Delta f$ is typically in the range of Hz or tens of Hz.

At the beginning of a measurement sweep, the transmission signal and the reference signal are synchronized to have the same phase. Due to the frequency difference $\Delta f$, the phase difference between the transmission signal and the reference signal will gradually increase during the measurement sweep. During the measurement sweep, the reflection signal formed by the reflection of the transmission signal at the surface of the product contained in the tank is being correlated with the reference signal, to form a measurement signal based on a time correlation between the reflection signal and the reference signal. Based on the measurement signal, the filling level can be determined.

Figure 2:
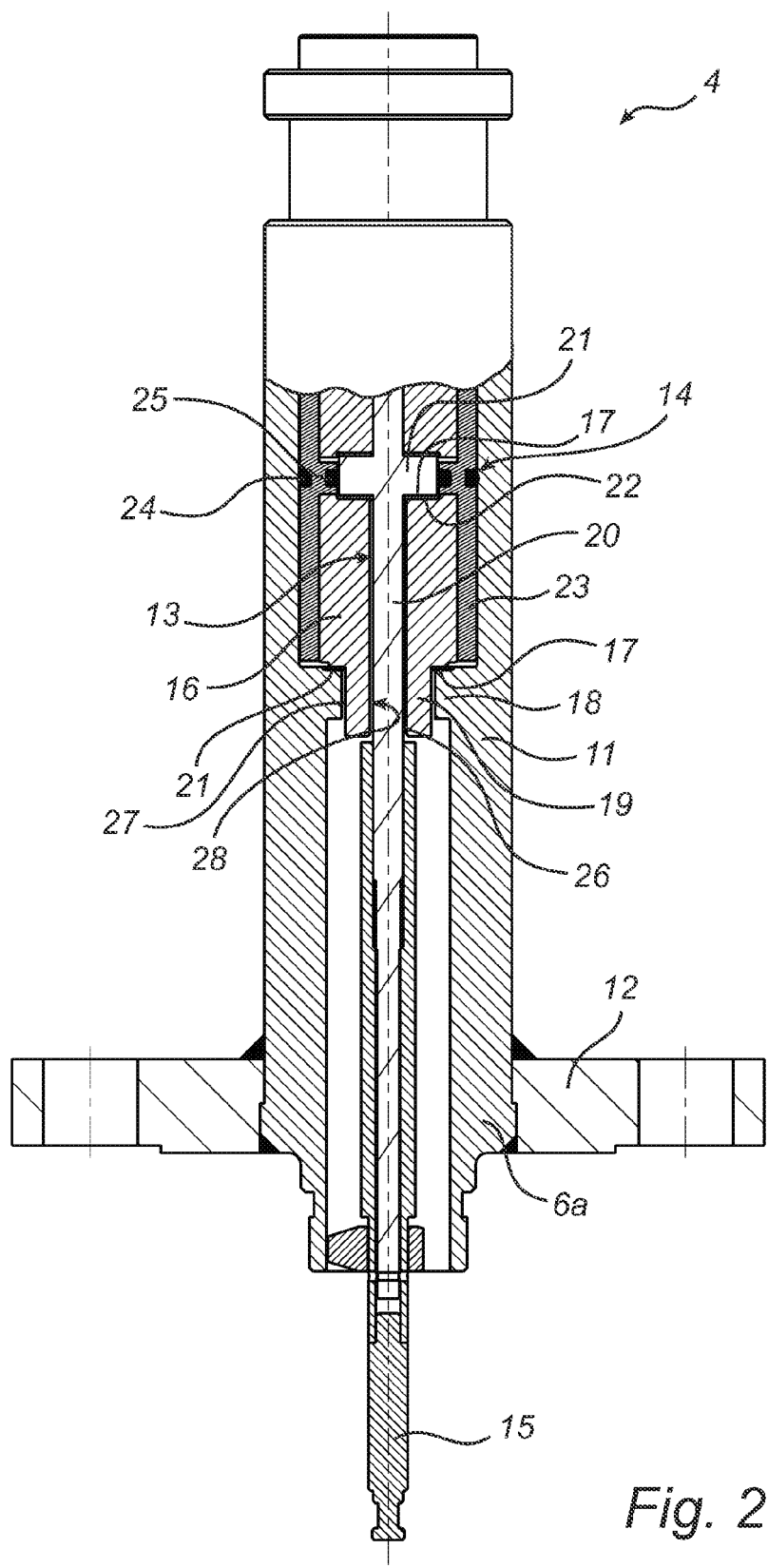
FIG. 2 is a sectional view of a sealing arrangement according to an first embodiment of the present invention.
Figure 3:
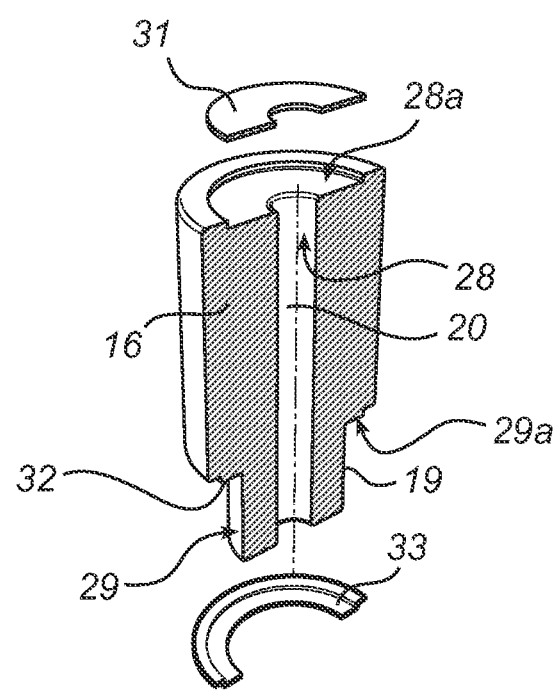
FIG. 3 is an exploded view of the dielectric sleeve and conducting members in FIG. 2.

FIGS. 2-3 illustrate in more detail a sealing arrangement 4 according to an embodiment of the present invention, here adapted for connection with a single line transmission probe. In the following description, when reference directions such as upper and lower are used, they relate to the orientation of the sealing arrangement during normal operating conditions, i.e. as indicated in FIG. 2.

The sealing arrangement 4 comprises a hollow housing 11, which is sealingly attached, e.g. welded, to the gauge flange 12. A central conductor 13 extends through the housing 11, and is arranged to provide electrical contact between the transceiver 2 and the probe 3. In its lower end the conductor is in electrical contact with an end connector 15 for connection of the probe (not shown in FIG. 2). The connector will be adapted to the type of probe (e.g. single line, twin line, coaxial line, etc).

The conductor body 13 is suspended in the housing by an impedance matched dielectric sleeve 16. The sleeve 16 rests against an annular support surface 17, formed by an inwards protruding portion 18 of the housing. In the illustrated case, the sleeve 16 further has a terminating lower portion 19 having a smaller radial extension, which extends beyond and below the protruding portion 18.

The terminating portion 19 has an extension such that it reaches below the lower surface of the protruding portion 18. This design has the technical effect that it will reduce the risk for electrical short circuit, as will be described in more detail below. The lower end of the terminating portion 19 may be tapered or otherwise formed so as to promote drainage of any liquid thereon.

The dielectric sleeve 16 further comprises a central hole 20, through which the conductor 13 extends. The conductor 13 further has an outwards protruding girdle 21, which rests against the upper annular surface 22 of the sleeve 16. The conductor 13 is thereby suspended in the housing 11 by the sleeve 16.

The sealing arrangement 4 further includes a tank seal 14, through which the conductor can pass into the tank in a sealing manner. In the illustrated example, the tank seal includes a sleeve 23 fitted coaxially with the sleeve 16 and extending above the upper end of sleeve 16. In level with the protruding portion of the sleeve 16, two sealing members 24, 25, such as o-rings, are arranged in recesses in sleeve 23, one 24 on the outside, facing the inside of the housing, and one 25 on the inside, facing the outside of the conductor.

Below the tank seal, the housing 11 is practically open to the tank, and tank atmosphere, containing e.g. vapor and gaseous contents, will therefore enter the interior of the housing 11. Especially in high pressure, high temperature conditions, such tank atmosphere may penetrate into gaps 26, 27 between the housing 11 and the dielectric sleeve 16 and between the dielectric sleeve 16 and the conductor 13. Any tank atmosphere may also condensate in the gaps.

The gaps 26, 27 are significantly exaggerated in FIG. 2, but cannot be entirely eliminated due to practical tolerances in the manufacturing of the various components, and/or differences in heat expansion coefficients. The gaps 26, 27 are formed along the inner and outer surfaces of the sleeve. In the illustrated embodiment, where the conductor 13, the sleeve 16 and the housing 11 are all co-axial, the gaps 26, 27 are cylindrical with a longitudinal axis extending in parallel with a longitudinal axis of the conductor 13.

When tank atmosphere enters these gaps and condensates, the effective radius of the dielectric sleeve is altered (becomes smaller) causing disturbance of the signal transmitted by the conductor. Especially under high temperature conditions, i.e. when the interior of the tank is held at an elevated temperature compared to the outside, there will be a significant temperature gradient through the tank wall, and thus also through the sealing arrangement of the radar level gauge. In particular, the sleeve 16, the conductor 13 and the housing 11 may have a lower temperature than the tank atmosphere, and thus cause condensation of any tank atmosphere that enters the gaps 26, 27.

To overcome this problem, according to an embodiment of the invention, portions of the surface of the dielectric sleeve 16 extending along the gap 26 and/or the gap 27, i.e. the inner surface of the sleeve 16 or the outer surface of the sleeve 16, is provided with an electrically conducting coating 28, 29. Further, the electrically conducting coating 28, 29 is brought into electrical conducting contact with an adjacent, electrically conducting surface, i.e. the surface of the conductor 13 and/or the housing 11.

In use, when transmit signals and echo signals are transmitted along the conductor, the electrically conducting coating provided on the surface of the dielectric sleeve will be brought into electrically conducting contact with the adjacent, electrically conducting surface of the conductor and/or the housing, thereby short-circuiting the gap 26, 27. This will eliminate, or at least mitigate, any influence of the gap and any medium contained therein on the signal transmission properties of the guided wave radar level gauge.

According to the illustrated embodiment, a first electrically conducting coating 28 is provided on the inner surface of the sleeve 16, i.e. along and outside the gap 26. A portion 28a of the coating 28 extends onto the upper annular surface 22 of the sleeve 16, where it is brought into contact with the protruding girdle 21 of the conductor 13. In order to improve the electrical contact between the conductor 13 and the coating 28, a conducting annular member 31 may be arranged between the upper annular surface 22 and the protruding girdle 21 of the conductor 13. The upper annular surface may be axially recessed into the dielectric sleeve 16 to allow alignment of the conducting annular member 31.

A second electrically conducting coating 29 is provided on the outer surface of the terminating portion 19 of the dielectric sleeve 16, i.e. along and inside the gap 27. A portion 29a of the coating 29 extends on to an annular surface 32 radially outside the portion 19, where it is brought into contact with the protruding portion 18 of the sleeve 16. In order to improve the electrical contact between the housing 11 and the coating 29, a conducting annular member 33 may be arranged between the lower annular surface 32 and the protruding portion 18 of the conductor 13. The lower annular surface 32 may be axially recessed into the dielectric sleeve 16 to allow alignment of the conducting annular member 33.

As mentioned above, the terminating portion 19 of the sleeve 16 extends a distance below the lower surface of the protruding portion 18, thereby reducing the risk for any electrical connection between the coating 28 and the coating 29.

The contacting annular members 31 and 33 may be formed of a material which improves coupling of the microwaves into and out of the electrically conductive coating 28, 29, such as carbon, graphite, or synthetic graphite. It is noted that in many applications, the annular members 31 and 33 will provide sufficient sealing to form the tank seal.

The dielectric sleeve 16 may be of any suitable material having appropriate electrical properties, including ceramic materials and plastic materials.

In case of a ceramic sleeve 16, the electrically conducting coatings 28 and 29 may be e.g. titanium nitride or silicon platinum, which are suitable for a depositing process. In case of a plastic sleeve 16, the electrically conducting coating 29 may instead be e.g. a nickel alloy, which is suitable for bonding with the plastic surface.

The person skilled in the art realizes that the present invention by no means is limited to the preferred embodiments described above. On the contrary, many modifications and variations are possible within the scope of the appended claims. For example, the detailed design of various elements may be different, as well as their mechanical relationship. Also, the sealing arrangement 4 may be scaled up or down in size for different applications, also without requiring analysis and adjustment of the shape for each new application.

What is claimed is:

1. A guided wave radar level gauge for determining a filling level of a product contained in a tank, which level gauge comprises:
    a transceiver for transmitting electromagnetic transmit signals and receiving electromagnetic echo signals reflected at a surface of said product, a probe, connected to said transceiver and configured to extend into said tank and to guide said transmit signals towards said surface and to guide said echo signals to said transceiver,
    a sealing arrangement comprising:
    a hollow housing,
    a conductor extending inside said housing for transmitting electromagnetic signals between said transceiver and said probe,
    a dielectric sleeve arranged inside said housing and surrounding said conductor,
    at least one gap, formed between said dielectric sleeve and an adjacent, electrically conducting surface, said gap having an open end facing said tank, allowing tank atmosphere to enter and condensate in said gap, and
    an electrically conducting coating provided on a surface of said dielectric sleeve facing said gap, and in electrical contact with said adjacent, electrically conducting surface, so that an impedance between said electrically conducting coating and said adjacent electrically conducting surface is sufficiently low at an operating frequency of said gauge to reduce an influence of any medium present in said gap.

2. The guided wave radar level gauge according to claim 1, wherein said electrically conducting coating and said adjacent electrically conducting surface are in galvanic contact to ensure that both sides of said gap are held at an equal electrical potential.

3. The guided wave radar level gauge according to claim 1, wherein said at least one gap includes a first gap formed between said sleeve and said conductor, and wherein said electrically conductive surface coating includes a first electrically conductive surface coating provided on an inner surface of said sleeve.

4. The guided radar level gauge according to claim 1, wherein said at least one gap includes a second gap formed between said sleeve and said housing, and wherein said electrically conductive surface coating includes a second electrically conductive surface coating provided on an outer surface of said sleeve.

5. The level gauge according to claim 3, wherein the conductor is suspended in relation to the housing by the dielectric sleeve.

6. The level gauge according to claim 4, wherein the conductor is suspended in relation to the housing by the dielectric sleeve.

7. The radar level gauge according to claim 5, wherein said conductor comprises a radially extending girdle, abutting against a support surface of the dielectric sleeve, so that said conductor is suspended by said dielectric sleeve.

8. The radar level gauge according to claim 7, wherein a portion of said first electrically conductive surface coating extends onto said support surface.

9. The radar level gauge according to claim 8, further comprising a first contacting member of an electrically conducting material arranged between said portion of said first conductive surface coating on said support surface and said radially extending girdle.

10. The radar level gauge according to claim 6, wherein said housing has an inwardly protruding portion, and wherein said dielectric sleeve has a suspension surface abutting against the protruding portion so that said dielectric sleeve is suspended by said housing.

11. The radar level gauge according to claim 10, wherein the dielectric sleeve has a terminating portion with reduced radius extending beyond said suspension surface, and wherein a portion of said second electrically conductive surface coating is provided on said suspension surface.

12. The radar level gauge according to claim 11, wherein said terminating portion extends a distance beyond said protruding portion.

13. The radar level gauge according to claim 11, further comprising a second contacting member of an electrically conducting material arranged between said inwardly protruding portion and said portion of said second conductive surface coating on said suspension surface.

14. The radar level gauge according to claim 1, wherein said electrically conducting surface coating is a metal alloy deposited on the sleeve.

15. The level gauge according to claim 1, wherein said dielectric sleeve is made of one of a ceramic material and a plastic material.

16. A method for determining a filling level of a product contained in a tank comprising the steps of:
    generating electromagnetic transmit signals,
    guiding said transmit signals towards said surface by means of a probe extending into said tank, guiding echo signals reflected at a surface of said product by means of said probe, receiving said echo signals, and determining said filling level based on a relationship between said transmit signals and said echo signals, transmitting said transmit signals and said echo signals along a conductor extending through a dielectric sleeve inside a housing, and bringing an electrically conducting coating provided on a surface of said dielectric sleeve into electrical contact with an adjacent, electrically conducting surface, thereby ensuring that an impedance between said electrically conducting coating and said adjacent electrically conducting surface is sufficiently low at an operating frequency of said gauge to reduce any influence of a medium present in a gap formed between said dielectric sleeve and said adjacent, electrically conducting surface, said gap having an open end facing said tank, allowing tank atmosphere to enter and condensate in said gap.

17. The method according to claim 16, wherein said electrically conducting coating and said adjacent electrically conducting surface are brought into galvanic contact to ensure that both sides of said gap are held at an equal electrical potential.

18. The method according to claim 16, wherein said at least one gap includes a first gap formed between said sleeve and said conductor.

19. The method according to claim 16, wherein said at least one gap includes a second gap formed between said sleeve and said housing.

* * * * *